April 21, 1970

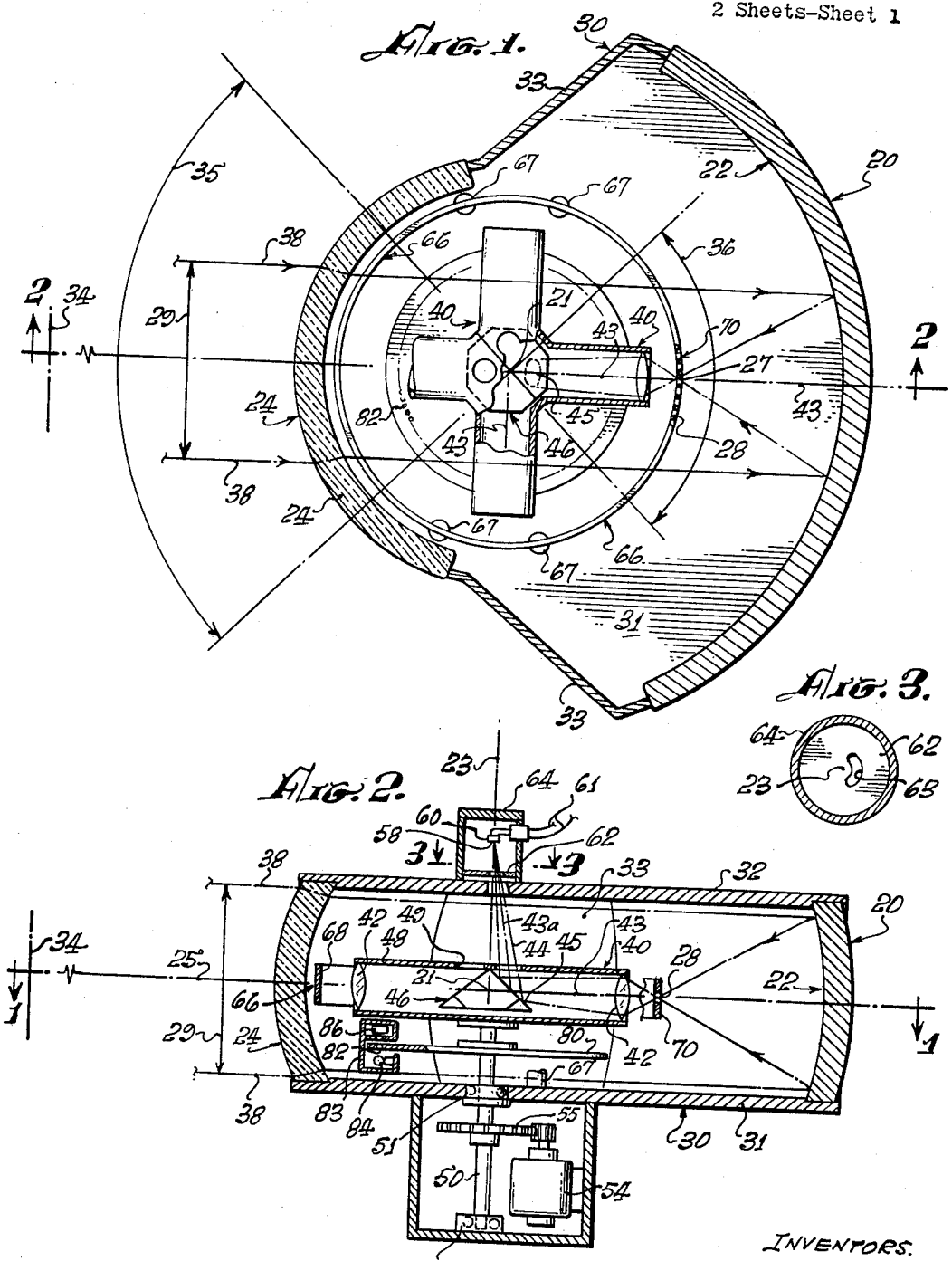

C. W. HARRIS ET AL 3,508,068

OPTICAL STRIP MAPPING SYSTEM

Filed April 13, 1967

INVENTORS.
CLYDE W. HARRIS,
ROBERT S. NEISWANDER,

By Charlton M. Lewis

United States Patent Office 3,508,068
Patented Apr. 21, 1970

3,508,068
OPTICAL STRIP MAPPING SYSTEM
Clyde W. Harris and Robert S. Neiswander, Santa Barbara, Calif., assignors to The TE Company, Santa Barbara, Calif., a corporation of California
Filed Apr. 13, 1967, Ser. No. 630,729
Int. Cl. H01j 3/16, 5/16
U.S. Cl. 250—236          16 Claims

ABSTRACT OF THE DISCLOSURE

A strip scene to be scanned is imaged onto an arcuate fixed grid. That primary image is then scanned by a moving optical relay system. The resulting signal is carrier encoded at a frequency imposed by the grid. That signal is demodulated, typically employing a reference signal derived from a second grid placed in side-by-side relation with the first and scanned by the same optical scanning device. For infrared images, the grid is temperature controlled and provides a thermal reference at each scene element. The optical scanner comprises several identical optical relay systems rotating continuously about the axis of the arcuate primary image in mutually fixed angular relation and successively scanning the image. Demodulation essentially without loss of resolution of the primary image is accomplished by electronically extracting a series of discrete signals each of which represents the average of the demodulated signal during a single cycle.

---

This invention has to do with means for optically scanning a scene and for developing a signal representing the intensity of electromagnetic radiation emanating from the scene as a function of position.

One aspect of the invention relates particularly to optical means for periodically scanning a line element of a scene. The term "scene" is here used to refer to any object to be scanned, whether near at hand or distant, and may have one, two or three significant dimensions. If a two-dimensional map of the scene is desired, as is usually the case, scanning movement perpendicular to the optically scanned line can be provided in a conventional manner, for example by interposing a movable mirror between the scanning mechanism and the scene, or by mounting the entire optical scanning mechanism on a platform that is movable in translation or in rotation perpendicular to the direction of optical scanning.

The optical scanning mechanism of the invention avoids many mechanical and optical disadvantages of previously available systems, and is remarkably simple and economical. Moreover, it is adaptable to the exclusive use of reflective optics, and is therefore useful not only in the visible region of the spectrum, but also for mapping at other wavelengths, including the relatively long wavelengths of electromagnetic radiation that are associated with thermal emission from bodies at moderate temperatures.

Such thermal mapping is useful for monitoring a field of view to detect abnormal temperature conditions. For example, thermal mapping of a forest area from a lookout tower is a known method of detecting forest fires. And thermal mapping from an airborne platform has important applications in military reconnaissance and related fields.

A preferred form of the present optical scanning system employs a fixed primary optical objective which reduces the strip scene to an arcuate image. That image is scanned periodically by an optical relay system rotating about the axis of curvature of the image and producing an output beam generally parallel to that axis. That relay system preferably rotates continuously and has a plurality of angularly spaced equivalent elements or spokes, permitting several scans per revolution of the relay assembly. An effective duty cycle close to 100% is thus available. The axial delivery of output radiation from the relay system facilitates sensing of the output by a single fixed detector.

A further aspect of the invention provides particularly accurate and reliable means for determining output signal magnitudes with reference to an absolute scale. The radiation signal is effectively compared to a standard reference signal between each pair of scene elements. For that purpose a fixed grid of alternately open and opaque areas is positioned at the line image formed by the primary objective system. As that image is scanned, the grid effectively chops the signal at a predetermined frequency. Thus the signal generated by the detector is carrier encoded at a frequency imposed by the grid. The chopping action is positively related to the scanning movement, each cycle of the carrier corresponding rigorously to a definite interval of scanning movement along the image. By maintaining the grid at a controlled temperature in thermal mapping systems, the reference level is positively determined. The resulting signal is amplified by alternating current techniques and is demodulated, preferably synchronously, for ultimate display, recording, or other utilization.

In accordance with a further aspect of the invention, the grid bars of the optical chopper are narrower than the clear areas between them. Those clear areas are preferably of such width that when the optical axis of the relay scanner is centered on a clear area of the grid the signal measured corresponds to the full intensity of radiation in the arcuate image. However, when the scanner is centered on a bar, the signal includes a contribution due to the reference grid and also a contribution due to the outside scene. That is, the output preferably represents an AC modulated signal whose peak-to-peak amplitude is some definite fraction, for example one half, that corresponding to 100% modulation. That intentional reduction in the amplitude of the alternating current signal component has the advantage of reducing gaps in the scene coverage and enhancing the system simplicity.

A further aspect of the invention provides direct generation of a reference frequency for synchronous demodulation of the radiation signal. The generated reference signal matches exactly the periodic signal variations in frequency and phase, independently of any slight irregularity of scanning rate or even of centering accuracy of the apparatus. That is accomplished by projecting an auxiliary reference beam through a chopping grid that corresponds directly to that for the main beam and may be positioned closely adjacent the latter. The reference beam is collected and supplied to a fixed reference detector by a rotating relay system which may utilize some or all of the optical components of the main relay optical system, suitable precautions being taken to avoid cross-talk between the two outputs.

A further aspect of the invention provides improved synchronous detection of a carrier encoded signal, producing an output that is responsive to signal frequency components of the same order of magnitude as the carrier frequency. Conventional demodulators, whether synchronous or non-synchronous, require a carrier frequency at least about three times the data rate frequency, since a minimum of about three cycles of carrier are needed to produce a smoothed signal element. With demodulation in accordance with the present invention, the carrier frequency may equal the frequency at which the scene elements are sampled without loss of effective resolution. That is accomplished by integrating the output of a conventional synchronous demodulator during substantially each full carrier cycle, transferring the accumulated voltage at the end of that period to a "hold circuit," as by a pulsed switch, and immediately resetting the integrating circuit to zero in preparation for the subsequent cycle. The output signals obtained periodically from the "holding circuit" are then completely independent of each other, each signal representing correctly an element of the sampled scene. The periodic output signals may be smoothed, if desired, but are preferably recorded or otherwise processed individually, thus retaining their full content of information.

A full understanding of the invention, and of its further objects and advantages, will be had from the following description of certain illustrative manners of carrying it into practice, with reference to the accompanying drawings. The particulars of that description and of the drawings are intended only as illustration and not as a limitation on the scope of the invention, which is defined in the appended claims.

In the drawings:

FIG. 1 is a section of an illustrative embodiment of certain aspects of the invention, taken on line 1—1 of FIG. 2;

FIG. 2 is a section on line 2—2 of FIG. 1;

FIG. 3 is a section at enlarged scale on line 3—3 of FIG. 2;

Figure 7:
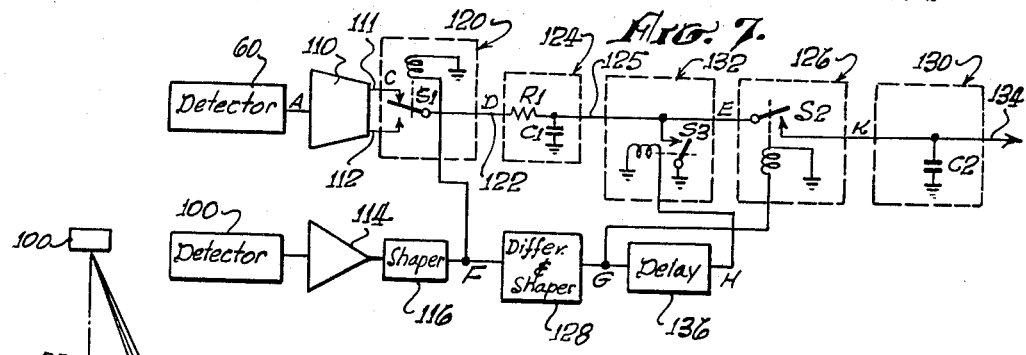
FIG. 7 is a schematic diagram representing a signal processing system in accordance with the invention.

An optical scanning system in accordance with the invention is shown illustratively and somewhat schematically in FIGS. 1 to 3, comprising the optical objective 20, the rotary relay assembly 40 and the radiation sensor 60. Objective system 20 includes the concave spherical mirror 22 with the center of curvature at 21 and the refractive correcting element 24 with spherical front and back surfaces concentric with mirror 22. Those elements are mounted in the radiation-excluding housing indicated schematically at 30, with base 31, top plate 32 and sides 33. The system may be used in any desired orientation, but for convenience of description FIG. 1 will be assumed to represent a horizontal section looking down.

Radiation from a scene 34 at the left of FIGS. 1 and 2 enters the system through correcting element 24 and is focussed by mirror 22 to form an arcuate real image 28 at a spherical focal surface concentric with the optical elements. The present invention utilizes only a narrow strip of that image at the plane 25, which is the plane of FIG. 1, corresponding to a similar strip of the scene 34. Object and image subtend equal azimuth angles 35 and 36 in the plane 25, which will be referred to as the optical plane of the system, and is the locus of the effective optical axis 43 during the scanning movement to be described. The geometrical axis 23 is perpendicular to optical plane 25 at optical center 21. The effective aperture of the optical system is indicated by the incoming beam 29, shown typically for the central point of scene 34, with limiting rays 38. The aperture corresponds to the vertical diameter of the optical elements 22 and 24, while their horizontal dimensions correspond typically to the vertical diameter increased by the angular range of view indicated at 35 and 36.

In accordance with one aspect of the present invention, the arcuate real image 28 is not sensed directly, but is angularly scanned periodically by rotation of the optical relay assembly 40 about main axis 23. The function of the relay assembly is essentially to image a variable point 27 of real image 28 at a substantially fixed point, preferably on or close to axis 23, enabling fixed radiation sensing means at that point to receive the relay image.

To increase the effective duty cycle of the sensing system, a plurality of identical relay systems is preferably provided, shown illustratively as four in the present drawings, mounted in fixed mutual relation with their axes 43 extending radially with respect to main axis 23 at uniform angular intervals. Each relay system comprises image forming optics, which may be either reflective or refractive, and are represented schematically in the present drawings by the single lens 42 with optical axis 43; and at least one reflective surface 45 intersecting relay axis 43 at an acute angle and effectively folding that axis generally parallel to geometrical axis 23, as shown at 43a in FIG. 2. Reflective surfaces 45 of the respective relay systems may conveniently be formed as coated faces of a common pyramidal prism 46. Each relay system is typically enclosed by a tubular housing 48, with side aperture 49 suitably placed to transmit the beam 44 after reflection from prism 46.

Relay assembly 40 is mounted for rotation about geometrical axis 23 by means of the shaft 50, journaled on the bearings 51. Shaft 50 is driven continuously in any suitable manner, as by the electric motor 54 and gear train indicated at 55, causing periodic scanning of image 28 by the several relay systems successively. The output beams of all relay systems intersect main axis 23 at a common point, forming a small acute angle, as shown clearly in FIG. 2. The relay image 58 is formed at that common intersection and is received on the working surface of a radiation sensor of any suitable type, indicated schematically at 60 with electrical connections 61 and enclosing housing 64. That sensor may, for example, comprise a photomultiplier or a photo-resistive transducer of conventional construction. The described relay system rotation causes axis 43a to swing about geometrical axis 23, with corresponding rotation of image 58. The sensor working surface is preferably mounted perpendicular to axis 23. The swinging movement then does not alter the angle of incidence of the relay beam on that surface. And if the effective area of the sensor is circular, rotation of the relay image does not affect the output signal from the sensor.

A circular shield 66 is mounted by means of the fixed posts 67 in the focal surface 28, typically comprising two distinct portions. One portion comprises the grid structure 70, extending through the angular range 36 of the utilized primary image and more fully described below. The rest of shield 66 forms the continuously opaque portion 68, extending from both ends of grid 70 and preferably completing 360°. The entire shield 66 is preferably maintained at constant temperature, at least for a system responsive to radiation in the far infrared. For example, the shield may be constructed in close heat exchange relation with a tube 72 (FIGS. 4 and 5), through which liquid from a constant temperature source of conventional type is continuously circulated. Some or all of the posts 67 may be hollow to accommodate that fluid.

Sensor 60 is preferably shielded from radiation transmitted by the relay systems that are not directed toward image 28, as by interposing a diaphragm 62 at a point of relay axis 43a at which the relay beams are spaced from main axis 23. An aperture in that diaphragm of suitable lunar shape, as shown somewhat schematically at 63 in FIG. 3, then transmits the beam of the active relay system, while shielding sensor 60 from any radiation that might otherwise be received from the inactive relay systems. Additional radiation shielding, not explicitly shown, is provided as required to eliminate the effects of stray radiation.

Figure 5:
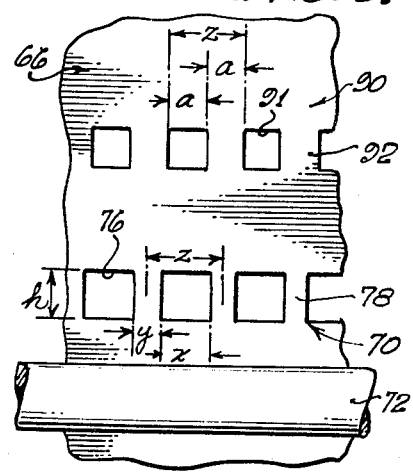
FIG. 5 is a fragmentary view at enlarged scale in the aspect of line 5—5 of FIG. 4.

FIG. 5 illustrates a preferred form for the apertures 76 of grid 70. The longitudinal dimension $x$ of those apertures (that is, the dimension parallel to the length of the grid) corresponds to the resolution of the system, which in practice is usually limited by the resolution of the optical system, but may be made coarser than that if desired. The longitudinal dimension $y$ of the bars 78 between adjacent apertures is preferably less than $x$, typically equal to $x/2$. The transverse dimension $h$ of the apertures is ordinarily equal to $x$, making the apertures square, as shown. However, many aspects of the invention are useful over a wide range of variation of the ratio $h/x$ depending upon such factors as the technique for producing transverse scanning movement and the desired transverse scanning interval. For systems operating in the visible region of the electro-magnetic spectrum, dimension $x$ is typically of the order of one mil, and grid 70 may then be produced photographically or by engraving techniques well known for making optical reticles. In the infrared region of the spectrum, $x$ may be of the order of 0.01 or even 0.1 inch, and grid 70 may then be made of metal by normal machining techniques. Fluid duct 72 for temperature control can then be integral with the metal of the shield, or joined thereto by solder or the like, to give good thermal contact.

Figure 6:
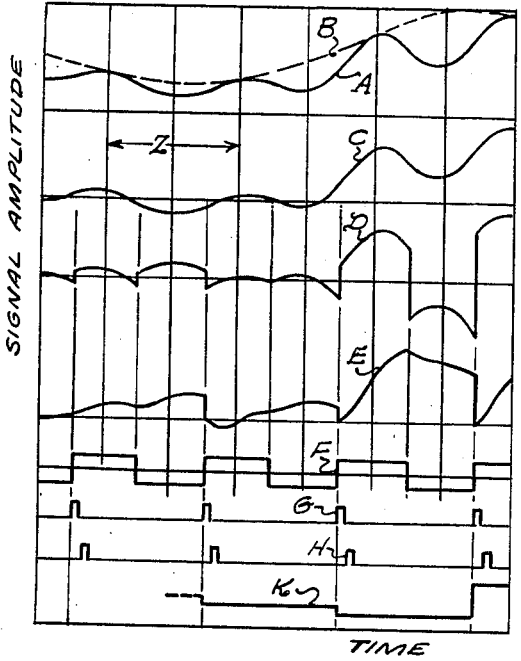
FIG. 6 is a graphical representation of electrical signals illustrative of the invention.

The optical system or systems of relay assembly 40 are preferably so designed that relay image 58 is considerably enlarged relative to primary image 28 in the plane of grid 70, the effective area of sensor 60 or of a suitable optical field stop in the relay system normally corresponding directly to the area of an individual grid aperture 76. The variations of intensity of the radiation reaching the sensor can then be visualized approximately by considering a mask with an opening of dimensions $x$ by $h$ to move along the row of apertures shown in FIG. 5. That intensity varies from a maximum value, when the mask aperture coincides with a grid aperture, to a minimum value when a grid bar 78 is centered in the mask. With $y=x/2$, as illustratively shown, the minimum signal value is approximately half the maximum, both levels varying also, of course, with the brightness of the imaged point of scene 34. The resulting electrical signal developed on lines 61 by sensor 60 then varies as a function of time in the manner illustrated by curve A of FIG. 6, the period of variation $z$ corresponding to the time required to scan one cycle of grid 70. Curve B represents an assumed brightness variation of the outside scene. Output signal A is thus an AC modulated signal whose peak-to-peak amplitude is some definite fraction, typically one half, of that which would be obtained from a 100% chopper.

To facilitate synchronous demodulation of the signal from sensor 60, it is convenient to generate a synchronous reference frequency simultaneously with the signal. That may be done in somewhat conventional fashion by mounting on shaft 50 a device of any suitable type for generating in response to shaft rotation a periodic reference signal with the desired frequency and phase relation to the described periodic variations of signal A. Such a device is represented somewhat schematically in FIG. 2 as the disk 80, fixedly mounted on shaft 50 and carrying a circular row of apertures 82 at angular spacings corresponding to those of apertures 76 of grid 70. A radiation source 84 and a detector 86 are mounted on opposite sides of disk 80 in alinement with apertures 82 at a selected angle about axis 23. The phase of the resulting reference signal is conveniently adjustable by shifting the entire mounting bracket 83 circumferentially of axis 23.

Figure 4:
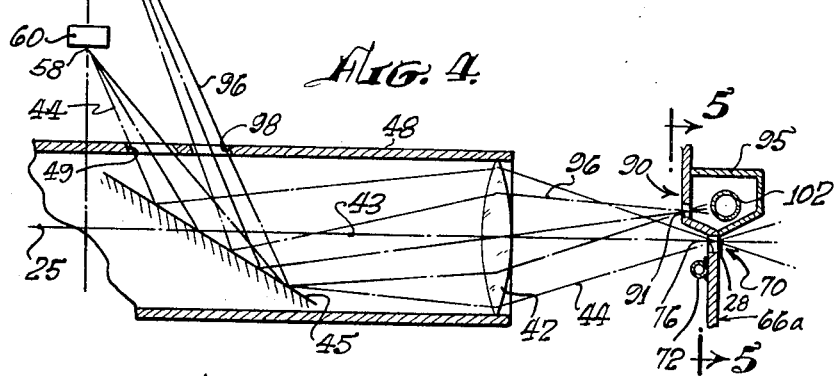
FIG. 4 is a fragmentary schematic section in the aspect of FIG. 2 and illustrating a modification.

A preferred means for generating a reference signal, in accordance with the present invention, is represented schematically in FIG. 4, which corresponds generally to a portion of FIG. 2 at enlarged scale, and in FIG. 5. One of the relay lenses 42 is shown in its tubular housing 48 on optical axis 43 with reflective surface 45 of prism 46. Shield 66a corresponds to shield 66 of FIG. 2, but carries, in addition to the main grid 70, already described, a second grid 90 comprising a row of reference apertures 91 and bars 92 in parallel spaced relation to grid 70. Reference apertures 91 are uniformly illuminated, as by a source 102, typically a gas discharge tube. That source, as well as the enclosing housing 95, may be curved about main axis 23, extending the entire length of grid 90, typically equal to that of main grid 70. Radiation beam 96 from reference grid 90 is imaged by relay lens 42 at the conjugate focal surface in a manner closely similar to main beam 44. After suitable reflection, typically by prism surface 45, the image is received on the working face of a radiation detector, indicated schematically at 100.

The electrical signal from detector 100 has a large alternating current component corresponding to grid 90. Due to the intimate and rigid relation between the two grids 70 and 90, the frequency and phase relations between the reference signal and the main radiation signal are positively defined, and tend to be independent of many factors, such as slight eccentricity of the mechanical structure, for example, which might introduce errors with the reference signal generator of FIG. 2. With multiple relay systems, as illustrated, even a departure from uniformity of angular spacing of those systems is accommodated by the reference signal generator of FIG. 4.

Although the reference grid form is ordinarily not especially critical, preferred dimensions for apertures 91 are shown in the upper portion of FIG. 5. The period of repetition $z$ of apertures 91 is the same as that for main apertures 76, but the bars 92 and apertures 91 have equal longitudinal dimensions $a$, which is less than $x$ in the main grid. It is then preferred to arrange the optical system by which apertures 91 are imaged at detector 100, or at a field stop in front of that detector, so that the resolution corresponds to dimension $a$. For example, if the optics of the relay system, indicated as the lens 42, are designed for large aperture with some sacrifice of definition, the effective aperture for reference beam 96 is preferably reduced, increasing the effective definition in that beam. An illustrative aperture stop for that purpose is indicated as the opening 98 in tube 48. The phase relation between the reference signal and the main signal is readily adjusted, for example by relative shifting of the two grids during manufacture or assembly, or by adjustment of the effective position of detector 100. Electrical phase adjustment is also available by means of conventional phase networks.

For many purposes the system so far described may be effectively utilized with conventional demodulation of the radiation signal produced by detector 60, preferably employing synchronous demodulation under phase control of the reference signal from a detector such as 86 of FIG. 2 or 100 of FIG. 4. However, improved accuracy and far greater resolution are obtainable by use of special demodulating means now to be described.

As shown schematically in FIG. 7, the AC component of signal A from detector 60 is amplified by amplifier 110 with output of push-pull form on lines 111 and 112. A typical amplifier 0° phase signal on line 111 is shown at C in FIG. 6. The 180° signal on line 112 is the inverse of C. The reference signal from detector 100, say, is amplified at 114 and is shaped by conventional techniques at 116 to form a square wave of proper phase, as indicated at F in FIG. 6. Demodulator 120 is shown illustratively as the double-pole relay switch S1, controlled by square wave F and producing on the line 122 a demodulated signal of typical form D, FIG. 6. Signal D is integrated by the circuit 124, typically comprising the series resistance R1 and grounded capacitance C1.

At regular intervals, corresponding to one cycle of the input signals, the voltage accumulated on the output line 125 from integrator 124 is transferred by switching means 126 to a holding circuit 130. That circuit comprises the output line 134 shunted to ground via the capacitance C2. Switching mechanism 126 typically comprises the relay switch S2, controlled by a voltage pulse having the desired phase. Such a pulse may be developed, for example, by differentiation of square wave F by circuits indicated at 128 in FIG. 7. Circuits 128 include means for rejecting the pulses of negative polarity and shaping the positive pulses to desired form, shown typically at G in FIG. 6.

Immediately following each voltage transfer from line 125 to holding circuit 130, the integrator output is reset to zero, as by momentary closure of the quenching circuit 132, shown as the relay switch S3 connected between line 125 and ground. A voltage pulse H for operation of S3 may be derived, for example, by passing pulse G through the delay circuit 136, which produces sufficient delay to insure switch S2 opening before S3 closes. That delay is preferably a small fraction of one cycle, so that for practical purposes the transfer and quenching actions may be considered simultaneous. Capacitance C2 is preferably small compared to C1, so that closure of S2 brings output line 134 essentially to the voltage of line 125 virtually independently of its previous voltage level. A typical voltage output on line 125 from integrator 124 is represented at E in FIG. 6, with corresponding output signal on line 134 indicated at K. That output can be amplified, displayed, recorded or otherwise utilized in any desired manner.

The relay switches S1, S2 and S3 are intended to be illustrative, like other features, of the present system. One or more of them may in practice be replaced by electronic devices of known type for producing equivalent switching functions under control of suitable input control pulses.

In operation of the described signal processing system, during the first half period of a cycle, corresponding typically to scanning of the grid apertures, integrator 124 is fed by the 0° phase signal; and during the second half cycle by the 180° phase signal. The voltage on line 125 at the end of the cycle is an integrated peak-to-peak comparison of the synchronous frequency component. The DC level, other frequency components, and any component in quadrature phase to the synchronous reference voltage all cancel on the average. Hence the output signal transferred to hold circuit 130 at the end of each cycle represents the actual radiation intensity received from the scene element scanned during that cycle. There can be no coupling between successively scanned scene elements, since after each scene element measurement the electronic system including the demodulator is restored to zero by quenching circuit 132. That result is in sharp contrast to conventional demodulation techniques, which require several carrier cycles to reach effective equilibrium.

Many aspects of the invention may usefully employ a primary image surface that is not circular, the optical scanning mechanism being modified appropriately. Also, an effectively circular primary image surface may be formed by a primary objective system that is not concentric. Moreover, for some purposes the primary objective system may be omitted entirely and the object to be scanned may be placed in the position of image 28. For that reason, the term "image" is employed in the appended claims in some instances in a sense that includes a radiation emitting or reflecting physical object as well as an optical image. The field stop for the relay system need not be at the detector, as has been assumed for purposes of description, but may comprise a physical stop near the grid, for example, or elsewhere. For convenience of definition, such terms as "demodulator" may properly be applied either narrowly to circuit 120 of FIG. 7 or its equivalent, or more broadly to that circuit plus some or all of the subsequent system for developing a final output signal. Integrating circuit 124 may be considered as a means for averaging the signal over a single cycle of the grid-induced variation. Many further modifications of the particular illustrative systems described may be made without departing from the proper scope of the invention, which is defined by the appended claims.

We claim:
1. In a strip mapping system, the combination of support structure,
   optical objective means fixedly mounted on the support structure for imaging a strip of a scene as a stationary arcuate primary image that is coaxial with respect to an axis,
   optical relay means mounted for coaxial rotation relative to the objective means and the primary image, said relay means receiving radiation from a portion of the arcuate image and forming a relay image thereof,
   radiation sensing means mounted on the support structure in position to receive said relay image and acting to produce an electrical primary signal representing the intensity of that image,
   means for driving the relay means continuously in its said rotation to intermittently angularly scan the primary image, and output means for utilizing the signal.

2. The combination defined in claim 1, and wherein said optical objective means comprise a spherical concave mirror having its center of curvature on said axis,
   and a refractive correction element positioned on the opposite side of the axis from the mirror and having spherical surfaces with centers of curvature coinciding with that of the mirror.

3. The combination defined in claim 1, and including also
   arcuate grid means mounted in fixed relation to said objective means in position to intercept said arcuate primary image and comprising radiation rejecting and radiation translating areas which alternate periodically along the length of the image for imposing on said signal a carrier frequency corresponding to the rate at which the relay optical means scan the primary image.

4. The combination defined in claim 3, and including also
   means for producing an electrical reference signal corresponding in frequency and phase to the carrier frequency imposed on said primary signal by said grid means,
   said output means including means responsive to the reference signal for synchronously demodulating the radiation signal.

5. The combination defined in claim 4, and wherein said means for producing an electrical reference signal comprise a reference grid corresponding generally to said grid means and adjacent thereto,
   means for substantially uniformly irradiating the radiation transmitting areas of the reference grid,
   said optical relay means being adapted to receive radiation from the reference grid and to form a substantially stationary image thereof spaced from said relay image,
   and second sensing means for receiving said image of the reference grid and for producing an electrical reference signal representing the intensity of that image.

6. The combination defined in claim 3, and wherein the longitudinal dimension of the radiation translating areas of the grid means correspond to the resolution of the overall system and exceeds the corresponding dimension of the radiation rejecting areas.

7. The combination defined in claim 1, and wherein said optical relay means include means for receiving light from said arcuate image in a generally radially inward direction with respect to said axis and means for projecting an image forming beam generally parallel to the axis to form said relay image adjacent the axis,
   said sensing means being mounted essentially on said axis in position to receive said image forming beam.

8. The combination defined in claim 1, and wherein said optical relay means include a plurality of optical relay systems mounted in mutually fixed relation angularly spaced with respect to said axis for successively scanning the primary image,
said sensing means being responsive to the relay image formed by each scanning relay system in succession.

9. A strip mapping system, comprising in combination
first and second elongated parallel grid means mounted in adjacent, mutually fixed relation and comprising corresponding longitudinally and periodically alternating radiation rejecting and radiation translating areas,
optical objective means for imaging an elongated scene to be mapped on the first grid means
means for irradiating the second grid means,
first and second sensing means responsive to radiation for producing respective first and second electrical signals representing the radiation intensity,
a unitary optical relay system for imaging corresponding limited regions of the two grid means on the respective sensing means, said optical system being movable to cause said imaged grid regions to simultaneously scan the lengths of the respective grids,
means for driving the optical relay system in said scanning movement to cause both signals to vary periodically in uniform phase relation,
means for receiving said signals and for synchronously demodulating the first signal under phase control of the second signal,
and output means for utilizing the demodulated first signal.

10. A strip mapping system as defined in claim 9, and wherein
said limited regions of the grid means have dimensions longitudinal of the grids that are of the same order of magnitude as the corresponding dimensions of said radiation translating areas of the respective grids.

11. A strip mapping system as defined in claim 9, and wherein
the longitudinal dimensions of the radiation rejecting and radiation translating areas of the second grid means are substantially equal,
and the longitudinal dimension of the radiation translating areas of the first grid means exceeds the corresponding dimension of the radiation rejecting areas thereof.

12. A strip mapping system as defined in claim 9, and wherein said output means comprise
means acting to integrate the demodulated first signal during at least a predetermined portion of each cycle of variation of the second signal,
holding circuit means capable of storing a signal,
means for transferring the integrated first signal to the holding circuit means and for resetting the integrating means after each said integration,
and output means for deriving a periodic series of output signals from the holding circuit means.

13. An image scanning system, comprising in combination
grid means mounted in effective superposition upon the image and comprising periodically alternating radiation rejecting and radiation translating areas,
sensing mens responsive to radiation for producing a signal representing the raditation intensity,
optical means actuable to scan the image and to direct image radiation translated by the grid means to the sensing means to produce a signal having an alternating current component corresponding to the periodicity of the grid means,
means for developing a reference signal having a periodicity corresponding to said signal component,
means for demodulating the signal,
and means acting under control of the reference signal to produce a periodic series of discrete signals each of which represents substantially the average value of the demodulated signal during a signal during a single cycle of the alternation thereof.

14. An image scanning system as defined in claim 13, and wherein the last said means comprise
means acting to integrate the demodulated signal during at least a predetermined portion of each cycle of the reference signal,
holding circuit means capable of storing a signal,
means for transferring the integrated signal to the holding circuit and for resetting the integrating means after each said integration,
and output means for deriving a periodic series of output signals from the holding circuit means.

15. A system for demodulating a signal having a periodic alternating current component, said system comprising in combination
means for synchronously demodulating the signal,
means for integrating the demodulated signal during at least a predetermined portion of each cycle of said alternation and independently of adjacent cycles thereof,
and means for developing a series of output signals each of which represents the integrated signal value for a single cycle of said alternation.

16. A system for demodulating a carrier encoded signal under control of a carrier reference phase, said system comprising in combination
means for synchronously demodulating the signal,
means for integrating the demodulated signal, the integrating means being resettable to normal condition,
holding circuit means capable of storing a signal,
means for transferring the output from the integrating means to the holding circuit means and for resetting the integrating means periodically under control of the reference phase,
and output means for deriving a periodic series of output signals from the holding circuit means.

References Cited

UNITED STATES PATENTS

| 2,907,889 | 10/1959 | Nichols et al. | 250—236 X |
| 3,118,062 | 1/1964 | Ilgenfritz et al. | 250—203 X |
| 3,349,325 | 10/1967 | Bajars | 250—236 X |
| 3,353,022 | 11/1967 | Schwartz | 250—203 X |

WALTER STOLWEIN, Primary Examiner

U.S. Cl. X.R.

250—214, 220; 328—63